United States Patent [19]

Inata et al.

[11] 4,064,108

[45] Dec. 20, 1977

[54] NOVEL POLYESTERS PREPARED FROM MIXTURE OF HYDROQUINONE AND BISPHENOLS

[75] Inventors: Hiroo Inata; Shoji Kawase, both of Iwakuni, Japan

[73] Assignee: Teijin Limited, Osaka, Japan

[21] Appl. No.: 708,756

[22] Filed: July 26, 1976

Related U.S. Application Data

[63] Continuation-in-part of Ser. No. 619,495, Oct. 3, 1975.

[30] Foreign Application Priority Data

Oct. 4, 1974 Japan .............................. 49-113730
Feb. 8, 1975 Japan .............................. 50-15902
Apr. 25, 1975 Japan .............................. 50-49782
Aug. 22, 1975 Japan .............................. 50-101118

[51] Int. Cl.² ................. C08G 63/18; C08G 63/60; C08G 63/68

[52] U.S. Cl. ..................................... 260/47 C; 260/49
[58] Field of Search ....................... 260/47 R, 47 C, 49

[56] References Cited

U.S. PATENT DOCUMENTS

3,160,602 12/1964 Kantor et al. .......................... 260/47
3,733,306 5/1973 Wolfes et al. .......................... 260/61

*Primary Examiner*—Lester L. Lee
*Attorney, Agent, or Firm*—Wenderoth, Lind & Ponack

[57] ABSTRACT

A linear copolyester having a reduced specific viscosity of at least 0.5 is prepared from terephthalic or isophthalic acid, a bisphenol and hydroquinone. The ester unit derived from terephthalic or isophthalic acid and hydroquinone is contained in the copolyester in a proportion of 5 to 35 mole%. The copolyester has superior crack resistance, thermal stability, transparency and chemical resistance.

6 Claims, No Drawings

NOVEL POLYESTERS PREPARED FROM MIXTURE OF HYDROQUINONE AND BISPHENOLS

This application is a continuation-in-part application of copending U.S. Ser. No. 619,495 filed on Oct. 3, 1975.

This invention relates to improved polyesters having superior crack resistance, thermal stability, transparency and chemical resistance.

Polyethylene terephthalate has gained widespread commercial acceptance because of its superior mechanical properties and chemical resistance, but possesses unsatisfactory dimensional stability and transparency because its heat distortion temperature is relatively low and its rate of crystallization is fast.

Polycarbonate resins, on the other hand, are known as materials having a high heat distortion temperature and superior transparency, but have a defect of unsatisfactory chemical resistance.

In an attempt to remedy such defects of the conventional polyethylene terephthalate, a method has already been proposed to polycondense terephthalic acid, isophthalic acid and/or the derivatives of these with dihydroxy aromatic compounds such as 2,2-bis(4-hydroxyphenyl) propane. It is known that the resulting aromatic polyesters have a high heat distortion temperature and superior transparency, and possess better chemical resistance than the polycarbonate resins. Our detailed investigations, however, have led to the discovery that although the chemical resistance of such aromatic polyesters is better than that of the polycarbonate resins, these aromatic polyesters immediately whiten in highly polar solvents such as acetone to lose their transparency, and also are susceptible to cracks upon application of flexural stress in the presence of solvent.

Accordingly, an object of this invention is to provide improved polyesters having superior crack resistance, thermal stability, transparency and chemical resistance.

Another object of this invention is to provide a process for advantageously producing such polyesters.

With a view to achieving the above objects, we have made extensive investigations, and found that by copolymerizing a specified proportion of hydroquinone with the aromatic polyesters described above, there can be obtained polyesters which have not only superior thermal stability and transparency but also resistance to solvents such as acetone, and crack resistance.

The invention provides a linear copolyester having a reduced specific viscosity of at least 0.5 and consisting essentially of (a) an ester unit derived from at least one aromatic dicarboxylic acid selected from terephthalic acid and isophthalic acid and hydroquinone and (b) an ester unit derived from at least one aromatic dicarboxylic acid selected from terephthalic acid and isophthalic acid and a bisphenol of the general formula

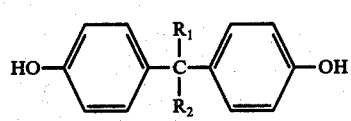

(I)

wherein $R_1$ and $R_2$, independently from each other, represent an alkyl group containing 1 to 6 carbon atoms, and may be linked to each other, the proportion of said ester unit (a) being 5 to 35 mole%.

Examples of preferred bisphenols of the general formula (I) above include 2,2-bis(4-hydroxyphenyl)propane (called bisphenol A), 1,1-bis(4-hydroxyphenyl)cyclohexane (called bisphenol Z), bis(4-hydroxyphenyl)methane, and 2,2-bis(4-hydroxyphenyl)butane. Of these, bisphenol A is most suitable.

The copolyesters in accordance with this invention are most characteristic in that a limited amount (5 to 35 mole%) of hydroquinone is copolymerized with a polyester derived from terephthalic and/or isophthalic acid and the bisphenol of formula (I), whereby the chemical resistance and crack resistance of the polyester are improved.

Up to 20 mole% of the ester units derived from terephthalic and/or isophthalic acid may be replaced by a unit derived from another dicarboxylic acid, for example, aromatic dicarboxylic acids such as naphthalenedicarboxylic acid, diphenyldicarboxylic acid, methylterephthalic acid, diphenoxyethanedicarboxylic acid, methylisophthalic acid, diphenyletherdicarboxylic acid or diphenylsulfonecarboxylic acid, aliphatic dicarboxylic acids such as succinic acid, adipic acid or sebacic acid, cycloaliphatic dicarboxylic acids such as hexahydroterephthalic acid or hexahydroisophthalic acid; or an ester unit derived from a hydroxycarboxylic acid such as p-hydroxybenzoic acid or hydroxycaproic acid.

Furthermore, up to 20 mol% of the ester unit derived from the bisphenol of formula (I) may be replaced by an ester unit derived from another diol, for example, aliphatic diols such as ethylene glycol, propylene glycol, trimethylene glycol, tetramethylene glycol, neopentyl glycol or hexaethylene glycol, alicyclic-containing aliphatic diols such as cyclohexane dimethylol or tricyclodecane dimethylol, and aliphatic diols containing an aromatic ring in the molecule such as bis(4-β-hydroxyethoxy) diphenylsulfone, 4,4'-bis(β-hydroxyethoxy)-diphenyl ether, 1,2-bis (4-β-hydroxyethoxyphenyl) ethane, 2,2-bis(4-β-hydroxyethoxyphenyl)propane, 1,1-bis(4-β-hydroxyethoxyphenyl) cyclohexane, or p-bis(β-hydroxyethoxy)benzene.

It is important that in the copolyesters of this invention, the amount of the ester unit from hydroquinone be limited to 5-35 mole% per 100 mole% of the sum of the ester units (a) and (b). If the amount is less than 5 mole%, the chemical resistance is not sufficiently improved. Amounts exceeding 35 mole% result in partial crystallization of the polymer and thus adversely affect the transparency of the polymer. The preferred content of the ester unit from hydroquinone is 7 to 30 mole%, especially 10 to 25 mole%.

The amount of the ester unit which partly replaces the ester unit derived from terephthalic and/or isophthalic acid, and of the ester unit which partly replaces the ester unit from the bisphenol of formula (I) should not exceed 20 mole%. Amounts in excess of this limit will result in various inconveniences such as reduced thermal stability, chemical resistance, and crack resistance.

The copolyesters of this invention should have a reduced viscosity of at least 0.5, preferably at least 0.6.

The copolyesters of this invention have markedly improved crack resistance with regard to their degrees of polymerization. The superior crack resistance is such that for example, when a flexural stress of 234 kg/cm² is exerted on a sample polymer in carbon tetrachloride at room temperature, the relation between the time K (seconds) that elapses until cracks occur in the sample and the reduced specific viscosity ($\eta_{sp/c}$) of the polymer satisfies the following expressions, when $\eta_{sp/c}$ is less than 1.0,
  log K $\geq$ 2.9 ($\eta_{sp/c}$) − 0.42; and
when $\eta_{sp/c} \geq$ 1.0,
  K > 300;
preferably,
when $\eta_{sp/.c}$ < 0.8,
  log K $\geq$ 2.9 ($\eta_{sp/c}$) + 0.16; and
when $\eta_{sp/c} \geq$ 0.8,
  K > 300.

In other words, the copolyester of this invention shows a high crack resistance of at least 21 seconds, preferably at least 80 seconds at a relatively low $\eta_{sp/c}$ of, for example, 0.60.

When a polyester from an aromatic dicarboxylic acid such as terephthalic or isophthalic acid and an aromatic diol such as bisphenol is to be prepared by a melt-polymerization method, it is difficult to increase its degree of polymerization. Since the copolyesters of this invention exhibit superior crack resistance with relatively easily attainable degrees of polyermization as described above, the invention has the advantage that it is not necessary to increase the degree of polymerization by going so far as to employ a difficult method.

The copolyesters of this invention show improved resistance to solvents such as acetone. The solvent resistance is such that when for example, a sample is immersed in acetone at room temperature for 1 day, the percentage (light transmission retention) of the light transmittance of the immersed sample based on the light transmittance of the sample before immersion is at least 50%, preferably at least 60%.

The copolyesters of this invention further have a heat distortion temperature of at least 130° C, preferably at least 140° C, and thus have superior thermal stability. In addition, they have satisfactory mechanical properties such as impact strength equal to or better than that of polycarbonate and superior tensile strength, and also superior transparency.

The copolyester of this invention can be prepared by reacting terephthalic and/or isophthalic acid or ester-forming derivatives thereof, hydroquinone, and the bisphenol of general formula (I) or ester-forming derivatives thereof. The other dicarboxylic acid or its ester-forming derivative illustrated hereinabove can be conjointly used in an amount of up to 20 mole% of the terephthalic acid, isophthalic acid or their ester-forming derivataives. Furthermore, the other diol or its ester-forming derivative illustrated hereinabove can be used in an amount of up to 20 mole% of the bisphenol of formula (I) or its esterforming derivative.

Examples of the ester-forming derivatives of terephthalic and/or isophthalic acid or the other dicarboxylic acid which are used in the reaction are aryl esters and acid chlorides of these acids, the aryl esters being preferred. Specific examples of the aryl esters are phenyl esters, tolyl esters, xylyl esters and naphthyl esters, the phenyl esters being preferred.

The terephthalic acid, isophthalic acid, or the ester-forming derivatives thereof may be used either alone or as an admixture of two or more.

Examples of the ester-forming derivatives of hydroquinone, the bisphenol of formula (I) and the other diols which are used in the reaction are esters formed between these diols and monocarboxylic acids containing 1 to 8 carbon atoms, for example, acetic acid esters.

According to the reaction of this invention, the acid component and the diol component are reacted at 200° to 500° C, preferably 230° to 320° C at atmospheric, elevated or reduced pressures, and then the reaction mixture is melt-polymerized at reduced pressure. When the resulting polymer has a high melting point, it is preferred to subject it further to solid-phase polymerization. When the solid-phase polymerization is performed, the melt-polymerization is carried out until the reduced viscosity of the reaction product reaches 0.1-0.4, and if desired, the reaction product is heat-treated at a temperature of, say 150° to 300° C to crystallize it, after which the solid reaction product in the form of powder or chips is heated at a temperature of 200° to 320° C in a stream of an inert gas or at reduced pressure to perform the solid-phase polymerization.

One recommendable metod comprises esterifying a free dicarboxylic acid component, i.e., terephthalic and/or isophthalic acid, and the other dicarboxylic acid if used, with a compound having one hydroxyl group directly bonded to an aromatic ring, i.e. an aromatic monohydroxy compound such as phenol, cresol or naphthol, and after the degree of the esterification has reached at least 80%, adding the diol component to the reaction system. Hydroquinone, one member of the diol component, may be present in the reaction system from the outset together with the aromatic monohydroxy compound. Where up to 20 mole%, based on the bisphenol, of an aliphatic diol is used, the aliphatic diol may be present in the reaction system from the outset together with the aromatic monohydroxy compound.

In one aspect of the method involving reacting the aromatic monohydroxy compound with the free acid component at the beginning, the acid component is reacted with the aromatic monohydroxy compound and the hydroquinone in the first step, and in the second step, the bisphenol is reacted with the reaction product of the first step.

According to another aspect of the process, the aliphatic diol and hydroquinone can be used either in the second step or both in the first and second steps, and according to still another aspect, the use of the aliphatic diol can be omitted.

Surprisingly enough, it has been found in accordance with the present invention that the polyesterforming reaction in the second step subsequent to the esterification reaction in the first step proceeds without any trouble, and particularly, the presence of phenol does not adversely affect the reaction in the second step.

Hydroquinone and its ester-forming derivative are used in a total amount of 5 to 35 mole% based on the acid component irrespective of whether they are present in the reaction system from the outset or added to the reaction system during the reaction.

When the aliphatic diol is used in the first step, its amount is not more than 20 mole% based on the acid component. When the aliphatic diol is used in the second step, its amount is the same as in the first step. Where it is used both in the first and second steps, its total amount in these steps should be adjusted to within the above range.

The amount of the aromatic monohydroxy compound is such that the total amount of it and the diol component is at least 210 mole% based on the acid component. When the amount is less than 210 mole%, the rate of the reaction is slow. The amount is preferably at least 230 mole%, more preferably at least 250 mole%. The upper limit is about 1,000 mole%.

The total amount of the bisphenol and hydroquinone is 98 to 130 mole%, preferably 100 to 120 mole%, based on the acid component. When it is less than 98 mole% or more than 130 mole%, the rate of polymerization becomes slow.

In the first step of the process of this invention, the reaction is carried out preferably at a temperature of 200° to 350° C (more preferably 230° to 320° C) and a pressure of 1 to 15 kg/cm² (absolute). In order to perform the reaction more effectively, water generated as a result of the reaction is distilled off from the reaction system, and the pressure is adjusted according to variations in the partial pressures of the aliphatic diol and the aromatic monohydroxy compound or the partial pressure of the aromatic monohydroxy compound, and the vapor pressure of water.

The reaction in the first step is carried out until at least 80 % of the carboxyl groups of the acid component react. When the conversion of the carboxyl groups is less than 80 %, the reaction of the reaction product with the bisphenol to be added does not fully proceed, and polyesters having the desired properties cannot be obtained. The preferred conversion of the carboxyl groups (the degree of esterification) is at least 85%, more preferably at least 90%.

Following the first step, the bisphenol, or bisphenol and hydroquinone, or hydroquinone, bisphenol and aliphatic diol are added to the reaction product of the first step, and the mixture is polycondensed (second step). Preferably, the polycondensation reaction is carried out at a temperature of 200° to 350° and a pressure of 760 to 0.001 mmHg. Usually, the reaction in the second step is carried out in the molten state. However, the solid-phase polymerization method described hereinabove may be used.

Preferably, a catalyst is used in the preparation of the copolyesters of this invention by the melt reaction described hereinabove. Examples of the catalyst are elemental metals such as sodium, potassium, lithium, calcium, magnesium, barium, tin, strontium, zinc, iron, aluminum, cobalt, lead, nickel, titanium, manganese, antimony or arsenic, and compounds of these metals such as their oxides, hydrides, hydroxides, halides, inorganic acid salts, organic acid salts, complex salts, double salts, alcoholates, or phenolates. Of these, titanium compounds such as titanium tetrabutoxide, titanium oxalate or titanium oxide, tin compounds such as dibutyltin oxide, antimony compounds such as antimony trioxide, and lead compounds such as lead oxide are preferred. The amount of the catalyst is usually 0.001 to 5 mole% based on the acid component. The catalyst may be added to the reaction system at an early stage of the reaction.

While preferred embodiments of preparing the copolyesters of this invention by melt reaction have been described hereinabove, it should be understood that the copolyesters of this invention can be prepared also by other melt reaction procedures, for example, a method which comprises reacting aryl esters of terephthalic and/or isophthalic acid and the other dicarboxylic acid if used with hydroquinone and bisphenol and the other diol if used, a method which comprises reacting terephthalic and/or isophthalic acid with hydroquinone, bisphenol and a diaryl carbonate, a method which comprises reacting acid chlorides of terephthalic and/or isophthalic acid and the other dicarboxylic acid if used, with hydroquinone and bisphenol and the other diol if used in solution, and a method which comprises reacting terephthalic acid with diacetates of hydroquinone and bisphenol.

In the present invention, additives such as catalysts, stabilizers or coloring agents generally used in the preparation of polyesters can be employed without any consequent trouble.

The present invention can afford polyesters having a high degree of polymerization, superior crack resistance, high thermal stability, and superior dimensional stability, transparency and chemical resistance.

The following Examples and Comparative Examples illustrate the invention in greater detail. In these examples, all parts are by weight. The various properties given in these examples were measured by the following methods.

Reduced specific viscosity ($\eta_{sp/c}$)

Measured at 35° C using a mixed solvent consisting of phenol and tetrachloroethane in a weight ratio of 60:40 while maintaining the concentration (C) at 1.2 g/deciliter.

Carboxyl number

Measured in accordance with the Conix's method (Macro. Molecular. Chem., 26, 226, 1958).

Crack resistance

An injection-molded plate-like article of the polymer, about 3.2 mm thick, about 10 mm wide and about 100 mm long, is placed on two edges apart from each other by 80 mm. Then, a load of 2 kg is exerted on the central part of the molded article, and the entire molded article is immersed in carbon tetrachloride while it is under flexural stress. The time that elapses until cracks occur in the molded article is measured, and expressed in seconds.

Light transmittance retention

An injection-molded plate-like article, about 3.2 mm thick, is used as a sample. The light transmittance of the sample is measured by a Poic integral spherical ultrafine turbidimeter (SEP-TU type, a product of Nippon Seimitsu Kogaku Kabushiki Kaisha). Then, the sample is immersed in acetone at room temperature for 1 day, and then its light transmittance is measured. The light transmittance retention (%) is calculated from the light transmittance of the sample before immersion in acetone and that after immersion in acetone.

Amount of hydroquinone copolymerized

The amount (mole%) of hydroquinone copolymerized in the polymer is determined by high resolving power nuclear magnetic reasonance spectroscopy.

Heat distortion temperature

Measured in accordance with ASTM D-648.

Degree of esterification in the first step

Calculated in accordance with the following equation.

Degree of esterification =

$$\frac{10^6 - \{(M_B - 2M_C) \cdot B + M_A\} \cdot (\frac{1}{2}) \cdot CV}{10^6 + (M_C - 18) \cdot CV} \times 100$$

wherein $M_A$, $M_B$ and $M_C$ are the molecular weights of the dicarboxylic acid component, the diol component and the aromatic monohydroxy compound, respectively (when any one of these components is a mixture of two or more compounds, its molecular weight is an average molecular weight of these compounds), B is the molar ratio of the diol component to the dicarboxylic acid component at the time of feeding the starting components, and CV is the carboxyl number of the reaction product measured after removing the excess of the aromatic monohydroxy compound from it.

EXAMPLE 1

A reactor equipped with a stirrer was charged with 318.0 parts of diphenyl terephthalate, 22.0 parts of hydroquinone, 193.8 parts of bisphenol A and 0.071 part of stannous acetate, and they were reacted at about 280° C for 60 minutes. The phenol generated was distilled off from the reaction system. The pressure of the inside of the reaction system was reduced gradually, and in 15 minutes, the pressure was adjusted to about 0.5 mmHg (absolute). At this reduced pressure, the reaction was carried out for amother 30 minutes. During this time, the reaction product solidified. It was taken out, and pulverized to a size of about 20 mesh on a Tyler mesh. The pulverized solid product was subjected to solid-phase polymerization at about 0.5 mmHg (absolute) for 30 minutes at 260° C, and then for 4 hours at 280° C. The resulting polymer had a reduced specific viscosity of 0.93.

The polymer was melted at about 370° C, and injection-molded through a die at about 100° C to form a sample plate having a size of about 3.2 mm × about 10 mm × about 50 mm. The resulting molded article was transparent, and when it was allowed to stand in acetone at room temperature for 1 day, it remained stable without any change. The heat distortion temperature, light transmittance, light transmittaince retention and crack resistance of the sample were measured, and the results are shown in Table 1.

Comparative Example 1

Using 254.4 parts of diphenyl terephthalate, 63.6 parts of diphenyl isophthalate, 239.4 parts of bisphenol A, and 0.071 part of stannous acetate, a polymer was prepared in the same way as in Example 1. The resulting polymer had a reduced specific viscosity of 0.95. An injection-molded article of this polymer obtained in the same way as in Example 1 was transparent. However, when it was immersed in acetone, its surface whitened in 5 minutes, and the molded article lost transparency. The properties of the sample were measured in the same way as in Example 1, and the results are shown in Table 1.

Example 2 and Comparative Example 2

A flask equipped with a stirrer was charged with 159.0 parts of diphenyl terephthalate, 159.0 parts of diphenyl isophthalate, 19.8 parts of hydroquinone, 198.4 parts of bisphenol A and 0.068 part of titanium tetrabutoxide, and they were reacted at 280° C under atmospheric pressure for 60 minutes. Then, the pressure of the inside of the reaction system was gradually reduced, and in 30 minutes, the pressure was adjusted to about 0.5 mmHg (absolute). At this pressure, the reaction was continued for an additional 4 hours to afford a polymer having a reduced specific viscosity of 0.77.

For comparison, the same procedure as above was repeated except that the amount of hydroquinone was changed to 3.3 parts, and the amount of bisphenol A, to 228.0 parts. A polymer having a reduced specific viscosity of 0.75 was obtained.

These polymers were each injection-molded into plate-like articles. After immersion in acetone at room temperature for 1 day, the sample of Example 2 was transparent, but the sample of Comparative Example 2 whitened and became non-transparent The properties of these samples were measured in the same way as in Example 1, and the results are shown in Table 1.

Comparative Example 3

Using 254.4 parts of diphenyl terephthalate, 63.3 parts of diphenyl isophthalate, 44.0 parts of hydroquinone (40 mole% based on the sum of diphenyl terephthalate and diphenyl isophthalate), 148.2 parts of bisphenol A, and 0.068 part of titanium tetrabutoxide, the same reaction as in Example 2 was carried out. The reaction mixture became turbid during the reaction, and the resulting polymer had a reduced specific viscosity of 0.51.

A molded article obtained from this polymer under the same conditions as in Example 1 was non-transparent. The properties of the sample molded article were measured in the same way as in Example 1, and the results are shown in Table 1.

EXAMPLE 3

A polymer having a reduced specific viscosity of 0.72 was prepared in the same way as in Example 2 except that 318.0 parts of diphenyl isophthalate was used instead of 159.0 parts of diphenyl terephthalate and 159.0 parts of diphenyl isophthalate, and 116.6 parts of biphenol Z and 99.2 parts of bisphenol A were used instead of 198.4 parts of bisphenol A. A molded article was prepared from the polymer and tested in the same way as in Example 1. The results are shown in Table 1.

Table 1

| | Polymer | | Properties of molded article | | | |
|---|---|---|---|---|---|---|
| Run No. | Amount of hydroquinone co-polymerized (mole %) | $\eta_{sp/c}$ | Heat distortion temperature (° C) | Light transmittance (%) | Light transmittance retention (%) | Crack resistance (seconds) |
| Example 1 | 19 | 0.93 | 172 | 81 | 88 | >300 |
| Comparative Example 1 | 0 | 0.95 | 171 | 80 | 14 | 40 |
| Example 2 | 17 | 0.77 | 165 | 77 | 83 | >300 |
| Comparative Example 2 | 3 | 0.75 | 164 | 78 | 16 | 17 |

Table 1-continued

| Run No. | Polymer Amount of hydroquinone co-polymerized (mole %) | $\eta_{sp/c}$ | Properties of molded article Heat distortion temperature (° C) | Light transmittance (%) | Light transmittance retention (%) | Crack resistance (seconds) |
|---|---|---|---|---|---|---|
| Comparative Example 3 | 42 | 0.51 | 161 | 16 | — | >300 |
| Example 3 | 17 | 0.72 | 163 | 75 | 82 | >300 |

EXAMPLES 4 to 6

An autoclave equipped with a rectification column and a stirrer was charged with 83.0 parts of terephthalic acid, 83.0 parts of isophthalic acid, 376 parts of phenol and 0.10 part of titanium tetrabutoxide, and purged with nitrogen. The mixture was heated to 285° C while the pressure of nitrogen was adjusted so that the absolute pressure of the reaction system was maintained at 7.0 kg/cm². In 15 minutes, the distillation of water began. The reaction was performed further for 200 minutes while the absolute pressure was gradually reduced down to 5.5 kg/cm². During this time, about 30 parts of water was distilled off. A part of the reaction product was taken out, and after removing the excess of phenol, its carboxyl number was measured. It was found to be 735 eq/$10^6$ g (the degree of esterification 89%)

The product was transferred to a reactor equipped with a stirrer, and bisphenol A and hydroquinone were added in the amounts shown in Table 2. The mixture was reacted for 60 minutes at 280° C. at atmospheric pressure. Then, the pressure of the reaction system was reduced gradually, and in 30 minutes, it was reduced to about 0.5 mmHg (absolute). At this pressure, the reaction was further carried out for 180 minutes to afford polymers having the reduced specific viscosities shown in Table 2.

Each of the polymers was dried, melted at 330° C, and injection-molded through a die at 130° C to form sample plates having the same dimensions as in Example 1. The properties of the samples were measured in the same way as in Example 2, and the results are shown in Table 2.

EXAMPLES 7 to 10

An autoclave equipped with a rectification column and a stirrer was charged with 83 parts of terephthalic acid, 83 parts of isophthalic acid, hydroquinone in the varying amounts shown in Table 3, 282 parts of phenol and 0.119 part of stannous acetate, and purged with nitrogen. The mixture was heated to 285° C while the nitrogen pressure was adjusted so that the pressure of the reaction system was maintained at 8.0 kg/cm² (absolute). Fifteen minutes later, the distillation of water began. Further, the reaction was carried out for 300 minutes while gradually reducing the pressure down to 5.0 kg/cm². During this time, water was distilled out. A part of the resulting product was taken out, and after removing the excess of phenol, its carboxyl number was measured. From the carboxyl number, the degree of esterification was calculated, and the results are shown in Table 3.

The reaction product was then transferred to a reactor equipped with a stirrer, and bisphenol A in the varying amounts shown in Table 3 was added. The mixture was reacted for 60 minutes at 280° C at atmospheric pressure. Then, the pressure of the reaction system was gradually reduced, and in 30 minutes, to about 0.5 mmHg (absolute). At this pressure, the reaction was carried out for an additional 240 minutes. The reduced specific viscosities of the resulting polymers are shown in Table 3.

Each of the polymers was dried, melted at 300 to 330° C, and injection-molded through a die at 100° C to form sample plates having the same dimensions as in Example 1.

Table 2

| Example | Amount of bisphenol A (parts) | Amount of hydroquinone (parts) | Polymer Amount of hydroquinone copolymerized (mole %) | $\eta_{sp/c}$ | Properties of molded article Heat distortion temp. (° C) | Light transmittance (%) | Light transmittance retention (%) | Crack resistance (seconds) |
|---|---|---|---|---|---|---|---|---|
| 4 | 216.6 | 12.1 | 10 | 0.76 | 164 | 62 | 82 | 280 |
| 5 | 182.4 | 27.5 | 24 | 0.74 | 164 | 65 | 94 | >300 |
| 6 | 166.4 | 35.2 | 30 | 0.73 | 163 | 66 | 95 | >300 |

The properties of the samples were measured in the same way as in Example 1, and the results are also shown in Table 3.

Table 3

| Example | Amount of hydroquinone (parts) | Degree of esterification (%) | Amount of bisphenol A (parts) | $\eta_{sp/c}$ | Polymer Amount of hydroquinone copolymerized (mole %) | Properties of molded articles Heat distortion temperature (° C) | Light transmittance (%) | Light transmittance retention (%) | Crack resistance (seconds) |
|---|---|---|---|---|---|---|---|---|---|
| 7 | 14.3 | 96 | 205.2 | 0.74 | 11 | 164 | 71 | 81 | 250 |
| 8 | 22.0 | 94 | 184.7 | 0.78 | 18 | 165 | 66 | 83 | >300 |

Table 3-continued

| | Polymer | | | | | Properties of molded articles | | | |
|---|---|---|---|---|---|---|---|---|---|
| Example | Amount of hydroquinone (parts) | Degree of esterification (%) | Amount of bisphenol A (parts) | $\eta_{sp/c}$ | Amount of hydroquinone copolymerized (mole %) | Heat distortion temperature (° C) | Light transmittance (%) | Light transmittance retention (%) | Crack resistance (seconds) |
| 9 | 27.5 | 95 | 182.4 | 0.72 | 23 | 163 | 68 | 86 | >300 |
| 10 | 33.0 | 96 | 166.4 | 0.72 | 29 | 163 | 70 | 92 | >300 |

EXAMPLE 11 AND COMPARATIVE EXAMPLE 4

An autoclave equipped with a rectification column and a stirrer was charged with 166 parts of terephthalic acid, 5.2 parts of neopentyl glycol, 22.0 parts of hydroquinone, 376 parts of phenol and 0.1 part of titanium tetrabutoxide, and purged with nitrogen. Then, while maintaining the pressure of the reaction system at 7.5 kg/cm² (absolute) by adjusting the nitrogen pressure, the mixture was heated to 280° C. After the distillation of water began, the pressure of the reaction system was gradually reduced down to 5.0 kg/cm² (absolute), and the reaction was performed for 300 minutes. During this time, about 33 parts of water was distilled off. A part of the resulting product was taken out, and after removing the excess of phenol, its carboxyl number was measured. It was found to be 227 eq/10⁶ g (the degree of esterification 96%).

The reaction product was transferred to a reactor equipped with a stirrer, and 193 parts of bisphenol A was added. The mixture was reacted for 60 minutes at 280° C under atmospheric pressure. Then, the pressure of the reaction system was gradually reduced, and in 30 minutes, to about 0.5 mmHg (absolute). At this pressure, the reaction was performed for an additional 90 minutes. The resulting polymer was taken out, solidified, and pulverized.

The resulting granular polymer (about 10 mesh on a Tyler mesh sieve) was fed into a reactor, and subjected to solid-phase polymerization for 60 minutes at 260° C. and 0.5 mmHg (absolute), and then for 120 minutes at 300° C.

For comparison, a polymer was prepared in the same way as in Example 11 except that 228 parts of bisphenol A was used, but hydroquinone was not used.

Each of the polymers obtained was injection-molded while maintaining the melting temperature at 360°–370° C and the mold temperature at 140° C to produce sample plates having the same dimensions as in Example 1, and the samples were tested in the same way as in Example 1.

The reduced specific viscosities of the polymers and the test results are shown in Table 4.

Table 4

| | Polymer | | Properties of molded articles | | | |
|---|---|---|---|---|---|---|
| Runs | Amount of hydroquinone copolymerized (mole %) | $\eta_{sp/c}$ | Heat distortion temperature (° C) | Light transmittance (%) | Light transmittance retention (%) | Crack resistance (seconds) |
| Example 11 | 18 | 0.97 | 161 | 63 | 82 | >300 |
| Comparative Example 4 | 0 | 1.01 | 169 | 67 | 12 | 38 |

What we claim is:

1. A linear copolyester having (1) a reduced specific viscosity of at least 0.5, measured at 35° C using a mixed solvent consisting of phenol and tetrachloroethane in a weight ratio of 60:40 while maintaining a concentration of 1.2 g/deciliter for the copolyester, and (2) a light transmittance retention of at least 50% after immersion for 1 day in acetone at room temperature,
   said copolyester comprising
   a. an ester unit derived from at least one aromatic dicarboxylic acid selected from the group consisting of terephthalic acid and isophthalic acid, and hydroquinone, and
   b. an ester unit derived from at least one aromatic dicarboxylic acid selected from the group consisting of terephthalic acid and isophthalic acid, and a bisphenol of the formula

wherein
   $R_1$ and $R_2$, independently of each other, represent alkyl containing 1 to 6 carbon atoms, and may be linked to each other,
the proportion of said ester unit (a) being 5 to 35 mole % based on the total of ester units (a) and (b).

2. The copolyester of claim 1 wherein up to 20 mole% of the bisphenol component in the ester unit (b) is replaced by at least one aliphatic diol selected from the group consisting of ethylene glycol, neopentyl glycol and cyclohexane dimethylol.

3. The copolyester of claim 1 wherein the relation between the crack resistance K (seconds) measured in carbon tetrachloride at room temperature under a flexural stress of 234 kg/cm² and the reduced specific viscosity of the polymer ($\eta_{sp/c}$) satisfies the following expressions:
   when $\eta_{sp/c} < 1.0$, $\log K \geq 2.9 (\eta_{sp/c}) - 0.42$, and
   when $\eta_{sp/c} \geq 1.0$, $K > 300$.

4. The copolyester of claim 1 wherein said bisphenol in the ester unit (b) is 2,2-bis(4-hydroxyphenyl)propane.

5. The copolyester of claim 1 wherein a total of up to 20 mole% of the aromatic dicarboxylic acid component in the ester units (a) and (b) is replaced by at least one dicarboxylic acid selected from the group consisting of naphthalenedicarboxylic acid, diphenyldicarboxylic acid, methylterephthalic acid, diphenoxyethanedicarboxylic acid, methylisophthalic acid, diphenyletherdicarboxylic acid, diphenylsulfonedicarboxylic acid, succinic acid, adipic acid, sebacic acid, hexahydroterephthalic acid, hexahydroisophthalic acid, p-hydroxybenzoic acid and hydroxycaproic acid.

6. The copolyester of claim 1 wherein the proportion of the ester unit (a) is 10 to 25 mole% based on the total of the ester units (a) and (b).

* * * * *